United States Patent [19]

Iwamoto et al.

[11] Patent Number: 4,733,249

[45] Date of Patent: Mar. 22, 1988

[54] PRINTER AND METHOD OF PRINTING

[75] Inventors: Kohei Iwamoto; Hitoshi Fukushima; Katusmori Takei; Yoshitaka Yamaguchi, all of Suwa, Japan

[73] Assignee: Seiko Epson Corporation, Tokyo, Japan

[21] Appl. No.: 73,549

[22] Filed: Jul. 15, 1987

Related U.S. Application Data

[63] Continuation-in-part of Ser. No. 69,681, Jul. 6, 1987, which is a continuation-in-part of Ser. No. 841,925, Mar. 20, 1986.

[30] Foreign Application Priority Data

Jun. 17, 1986 [JP] Japan ................................ 61-168265

[51] Int. Cl.[4] ................................................ G01D 15/00

[52] U.S. Cl. ..................................... 346/74.4; 346/105

[58] Field of Search ...................... 346/74.2, 74.4, 105, 346/106; 101/DIG. 5; 400/119; 358/301

[56] References Cited

U.S. PATENT DOCUMENTS 3,512,170 5/1970 Nelson ................................ 46/74.2

4,701,768 10/1987 Komiya et al. .................... 346/74.2

*Primary Examiner*—Arthur G. Evans

*Attorney, Agent, or Firm*—Blum Kaplan

[57] ABSTRACT

A printer and method of printing on a transfer medium utilizing thermoplastic magnetic ink. A thermal head selectively applies thermal energy to melt selected portions of the thermoplastic magnetic ink. A magnetic head substantially spatially fixed relative to the thermal head applies the magnetic force to the thermoplastic ink which causes the melted portions to be ejected onto the transfer medium. A strip of thermoplastic magnetic ink medium is positioned to slide between the thermal head and the transfer medium. The strip includes a base layer facing the thermal head and a magnetic thermoplastic ink layer facing the transfer medium. A first movement mechanism moves either the transfer medium or the thermal and magnetic heads relative to the other at a first speed. A second movement mechanism moves the magnetic thermoplastic ink medium strip relative to the magnetic and thermal heads at a second speed. The first and second speeds are unequal. The method includes moving a thermoplastic magnetic ink medium at a first speed relative to a thermal head and moving a magnetic head and thermal head at a second speed not equal to the first speed relative to the transfer medium. Selected portions of the thermoplastic magnetic ink medium are melted with a thermal print head. The melted ink from the thermoplastic magnetic ink medium is transferred to the transfer medium by a magnetic force applied by a magnetic head.

22 Claims, 10 Drawing Figures

PRINTER AND METHOD OF PRINTING

BACKGROUND OF THE INVENTION

This application is a continuation-in-part of application Ser. No. 69,681 filed on July 6, 1987 which application is a continuation-in-part of application Ser. No. 841,925, filed on Mar. 20, 1986.

The invention is generally directed to a printer and a method of printing and in particular to a non-impact printer and printing method for printing characters and graphic images by transferring thermoplastic magnetic ink onto a transfer medium by application of heat and magnetic force.

A number of compact and low cost non-impact printers using magnetic ink have been proposed. Japanese patent publication No. 96541/77 discloses such a printing apparatus in which magnetic ink is used as the ink material for magnetic and thermal transfer of the melted ink. The magnetic attraction force produced by the magnet, which is separate from the heat supply or thermal head, acts on the ink to form the desired thermal images. Reference is made to FIG. 1 wherein a printer generally indicated as 120 in accordance with Japanese patent publication No. 96541/77 is depicted. Printer 120 includes a thermal head 121 which receives pulse signals indicative of dots to be printed. Thermal head 121 rests against magnetic ink medium 122 which includes a base film 123 and a thermoplastic magnetic ink layer 124. Thermoplastic magnetic ink 124 is allowed to contact transfer paper 125 during the time that thermal head 121 applies thermal energy to base film 123. After the ink 124 is melted in the appropriate locations magnet 126 rips the melted ink 124 off of base film 123 and onto transfer paper 125.

In prior art printers the magnetic ink medium 122 and transfer medium 125 are moved at a uniform speed relative to the thermal and magnetic heads. In other words, the relative speed between the magnetic ink medium 122 and the transfer medium 125 in the printing area between thermal head 121 and magnet 126 is zero. As a result, when printing is performed at very high speeds, insufficient amounts of the ink 124 are transferred onto transfer medium 125. Thus, the amount of ink actually transferred for each dot to be printed is quite small. This causes very light printing which has a generally inferior quality. In addition, because the contact area between the ink 124 and transfer paper 125 becomes quite small, such a printer has a disadvantage in that the ink must be capable of being easily torn off the ink medium which has the effect of reducing its adherence to the transfer paper.

When only the outlines of the printing data are to be printed on the transfer medium in a draft printing mode, the number of dots to be printed is generally reduced. While draft printing does not require the strong attractive force of the ink to the transfer medium as does the high quality printing, there is a need to reduce the consumption of the magnetic ink medium to minimize the cost of operating the printer.

Accordingly, there is a need for a high quality printer and method of printing characters and graphic images by transferring thermoplastic magnetic ink onto a transfer medium utilizing heat and magnetic force which produces high quality printing and is capable of minimizing use of the magnetic ink medium in a draft mode.

SUMMARY OF THE INVENTION

The invention is generally directed to a printer for printing on a transfer medium and includes a thermal head for selectively applying thermal energy to melt selected portions of the thermoplastic magnetic ink. A magnetic head which is spatially fixed relative to the thermal head applies the magnetic force to the thermoplastic magnetic ink which causes the melted thermoplastic magnetic ink to be transferred onto the transfer medium. A first movement mechanism moves either the thermal and magnetic heads or the transfer medium relative to the other at a first speed. A long strip or ribbon of thermoplastic magnetic ink medium is positioned to slide between the thermal head and the transfer medium. The strip includes a base layer which faces the thermal head for heating thereby and a thermoplastic magnetic ink layer facing the transfer medium. A second movement mechanism moves the thermoplastic magnetic ink medium strip relative to the thermal and magnetic heads at a second speed. The first and second speeds are unequal. Where the first speed is greater than the second speed the printer prints in a draft mode, minimizing the amount of the magnetic ink medium used. Where the second speed is greater than the first speed a high quality high density printing is achieved.

The invention is also generally directed to a method of printing with a printing apparatus having a thermoplastic magnetic ink medium and transfer medium in opposing relation in which the method includes melting the ink medium using thermal energy supplied by a thermal head. The melted ink is transferred onto the transfer medium by applying a magnetic force applied by a magnetic generating mechanism when the thermal energy is applied. The magnetic generating mechanism or the transfer medium is moved relative to the other at a first speed. The ink medium is moved relative to the magnetic head at a second speed where the first and second speeds are unequal. By making the first speed greater than the second speed high quality printing is obtained. By making the second speed greater than the first speed draft mode printing is achieved with a reduction in consumption of the magnetic ink medium.

Accordingly, it is an object of the invention to provide an improved printing apparatus and method for printing.

Another object of the invention is to provide an improved apparatus and method of printing which creates the ability to produce high quality printing and printing in a draft mode which conserves the magnetic ink medium.

Yet another object of the invention is to provide an improved printer and method for printing on a transfer medium utilizing thermoplastic magnetic ink by driving the thermoplastic magnetic ink ribbon at a different speed than the magnetic and thermal heads are moving relative to the transfer medium.

A further object of the invention is to increase the amount of thermoplastic magnetic ink transferred onto the transfer medium for each printable dot during the printing portion of the transfer. By making the relative speed of movement between the thermal and magnetic heads and the magnetic ink medium greater than the relative speed between the transfer medium and the magnetic and thermal heads a dark and dense high quality printing is provided.

Still another object of the invention is to reduce the amount of magnetic ink medium utilized in a draft printing method by making the relative speed between the magnetic and thermal heads and the magnetic ink medium lower than the relative speed between the transfer medium and thermal and magnetic heads so that less of the magnetic ink medium ribbon is utilized per character.

A further object of the invention is to provide a reliable printer and method of printing which provides normally formed dots on a transfer medium which has poor surface smoothness while preventing the transferred ink from easily coming off the transfer medium.

Still another object of the invention is to provide a method of printing which provides dark and dense dots utilizing a thermoplastic magnetic ink medium to produce high quality printing.

Still a further object of the invention is to provide a printer and method of printing which reduces the cost of printing a draft mode.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
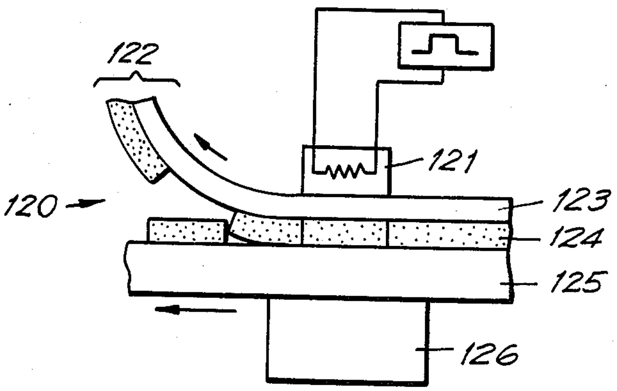
FIG. 1 PRIOR ART
FIG. 1 is a schematic view of a printer utilizing thermoplastic magnetic ink in accordance with the prior art.
Figure 2A:
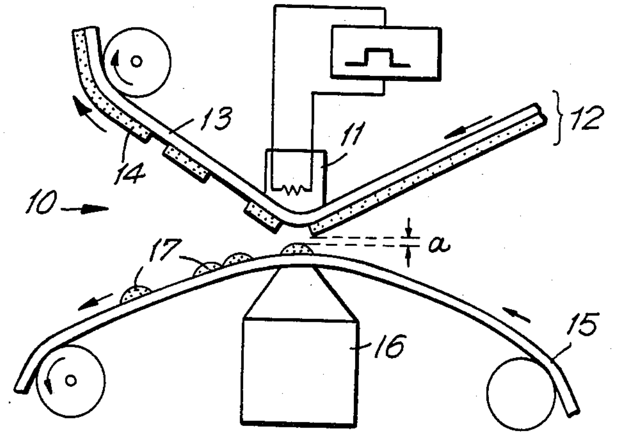
FIG. 2A is a schematic view of a printer utilizing the method of printing in accordance with the invention.

Reference is made to FIG. 2A wherein the printing apparatus and method of printing in accordance with the invention are generally depicted. For purposes of convenience in the following discussion the relative speed between the magnetic generating mechanism 16 (and thermal head 11) and the magnetic ink medium 12 is indicated as "x". The relative speed between the transfer medium 15 and the magnetic generating mechanism 16 (and thermal head 11) is indicated as "y". A serial printer has a carriage with a mounted head having a magnetic generating mechanism and a thermal energy applying mechanism. The carriage including the magnetic generating mechanism and thermal energy applying mechanism (referred to as the "thermal head" and "magnetic head", respectively) move during printing while the transfer medium does not. In a line printing apparatus the thermal and magnetic heads are not moved during the printing. Instead, the transfer medium is moved.

Printer 10, constructed in accordance with the invention includes a thermal head 11 which is used to apply thermal energy to melt the thermoplastic magnetic ink. When a heat generating signal is applied in accordance with a print command, thermal head 11 heats and melts a desired dot portion of magnetic layer 14 on a supporting member 13 of magnetic ink film medium 12. The melted magnetic ink is then transferred onto transfer medium 15 by magnetic head 16 which generates a magnetic attraction force. In another configuration magnetic head 16 may be positioned on the same side of transfer medium 15 and may generate a repulsive magnetic force for transfer of the melted magnetic ink. In printer 10, the relative positioning of thermal head 11 and magnetic head 16 is uniform. Magnetic ink medium 12 does not contact transfer medium 15 during the printing period and the spacing "a" is set at for example 100 μm. Magnetic ink medium 12 and transfer medium 15 move at speeds of x mm/sec and y mm/sec, respectively relative to magnetic head 16, in the direction of the arrows (i.e. from right to left in FIG. 2A). In accordance with the invention, x is either greater than or less than but not equal to y. Magnetic head 16 may be a permanent magnet. In a preferred embodiment magnetic head 16 is a samarium magnet having a magnetic energy of 15MG.Öe. The thermal head may be a thick film head having a density of 180 DPI and including 24 dots (thermal generating dots).

The thermoplastic magnetic ink medium 12 includes a supporting layer 13 and a thermoplastic magnetic ink layer 14 which is uniformly coated. In a preferred embodiment magnetic ink layer 14 has a uniform thickness of about 6 μm. In the preferred embodiment supporting layer 13 is a polyethylene terephthalate (PET) film having a thickness of 6 μm. Magnetic ink layer 14 in a preferred embodiment consists of the following composition.

magnetite particle (diameter=0.1 μm): 40 wt %
carnauba wax: 20 wt %
paraffin wax: 30 wt %
EVA (Ethylene Vinyl Acetate): 5 wt %
dispersing agent: 1 wt %
dye: 4 wt %

Figure 2B:
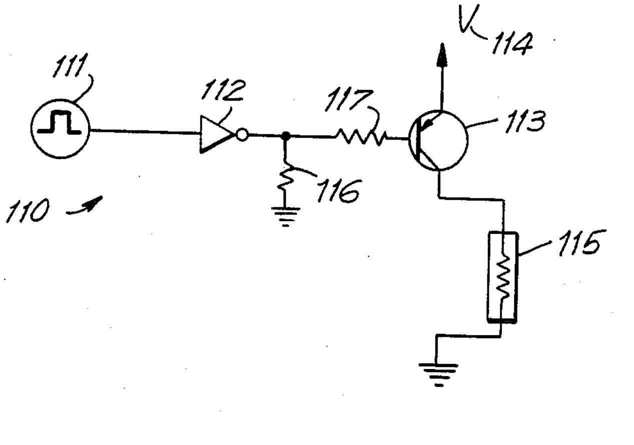
FIG. 2B is a schematic circuit diagram of the driving circuit used in a thermal head in accordance with the printer and method of the present invention.

Reference is next made to FIG. 2B wherein a driving circuit 110 in accordance with the invention is depicted. Driving circuit 110 includes a pulse generator 111.

When a printing command is delivered to printer 10 a printing pulse is generated by pulse generator 111. The pulse is inverted by inverter 112. The inverted pulse is delivered to the base terminal of transistor 113 through a series resistor 117. A biasing resistor 116 is coupled between the junction between inverter 112 and resistor 117, and ground. An application voltage 114 is coupled to the emitter terminal of transistor 113. The collector terminal of transistor 113 is coupled to heat generating portion 115 of thermal head 11. The printing pulse which is inverted by inverter 112 is thus supplied as the base signal to switch the application voltage 114 to heat generating dot portion 115 of thermal head 11 for the application time (length of the printing pulse).

Figure 3A:
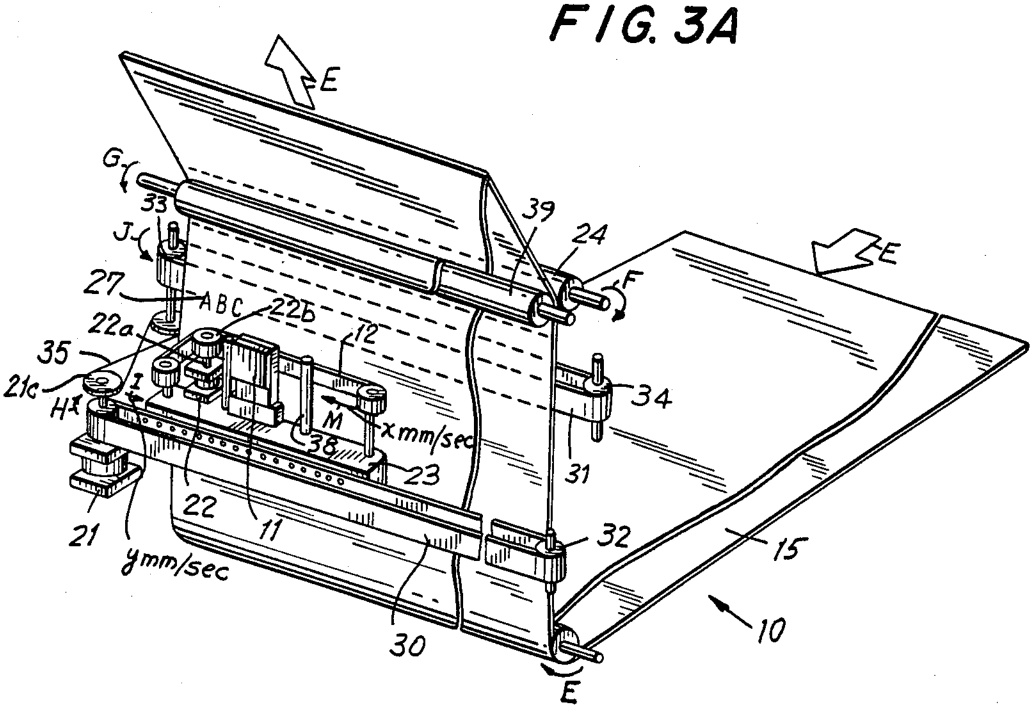
FIG. 3A is a partial perspective view of a printer constructed in accordance with the invention with non-essential and conventional elements removed for ease of explanation.
Figure 3B:
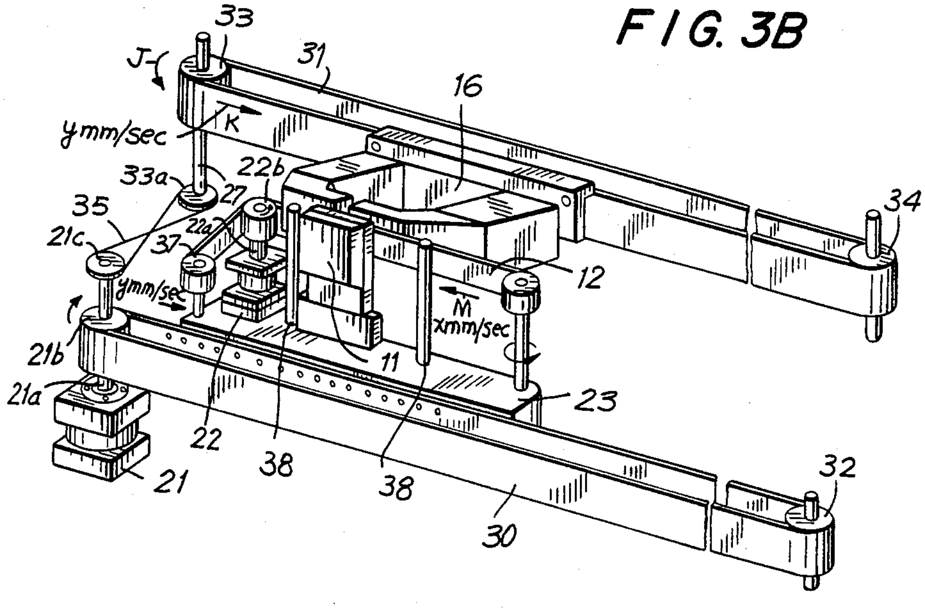
FIG. 3B is a perspective view similar to FIG. 3A with the transfer medium and transfer medium guide elements removed for clear viewing of various elements behind the transfer medium.

Reference is next made to FIGS. 3A and 3B wherein detailed perspective views of the relevant elements of a printer 10 constructed in accordance with a preferred embodiment of the invention is depicted. FIG. 3B is an enlarged version of FIG. 3A with the transfer medium and paper guiding elements removed for ease of explanation and to describe the elements normally found behind the transfer medium.

As shown in FIGS. 3A and 3B, thermal head 11 is reciprocated synchronously with magnetic head 16 so that there is no relative change in position as carriage 23, bearing thermal head 11 is reciprocated. Thermal head 11 is mounted on a carriage 23 which is mechanically coupled to a belt 30. Belt 30 is driven by a motor 21 having a drive shaft **21*a* and a drive pulley 21*b* around which belt 30 is wound. Belt 30 is also supported by a roller 32. Magnetic head 16 is mechanically coupled to a second belt 31 supported around rollers 33 and 34. Drive shaft 21*a* also has a drive pulley 21*c* which is coupled to a drive pulley 33*a* mounted on shaft 27, which also supports drive pulley 33. Specifically, drive pulleys 21*c* and 33*a* are coupled by a connecting belt 35 which transmits the rotation of drive shaft 21*a* to drive pulley 33 so that magnetic head 16 and thermal head 11 both move at y mm/sec relative to transfer medium 15. Transfer medium 15 is shown moving in the direction of arrows E driven by the rotation of drive pulley 24 in the direction of arrow F and the rotation of press roller 39 in the direction of arrow G. Drive pulley 216 is driven in the direction of arrow H by motor 21 which causes carriage 23 and thermal head 11 to move in the direction of arrow I at speed y. As a result of the mechanical coupling roller 33 rotates in the direction of arrow J which causes belt 31 and magnetic head 16 to move in the direction of arrow K at speed y. Rotation of motor 27 causes thermoplastic magnetic ink medium 12 to move in the direction of arrow M at speed x. While thermal head 11 and magnetic head 16 are shown moving in a first direction, they may also move together in the opposite direction. In any event, the mechanical arrangement allows thermal head 11 and magnetic head 16 to move in unison relative to the transfer medium 15**.

A motor 22 having a drive shaft **22*a* and drive pulley 22*b* drives ink medium 12 from ink ribbon supply reel 36 to a take up roller 37 at a speed of x mm/sec. Guide shafts 38 on both sides of thermal head 11 guide the ink medium ribbon 12 so as to be substantially parallel to thermal head 11 and transfer medium 15. Roller 22, reel 36 and 37 and guide shafts 38 are mounted on carriage 23 so that they move with carriage 23. As shown in FIGS. 3A and 3B, ink medium 12 is formed as an ink film or ribbon of extended length. Because motor 22 is supported on carriage 23, it operates completely independently of motor 21 which drives thermal head 11 and magnetic head 16. In this way, motor 21 and motor 22** can be set to produce different speeds y and x, respectively.

Figure 3C:
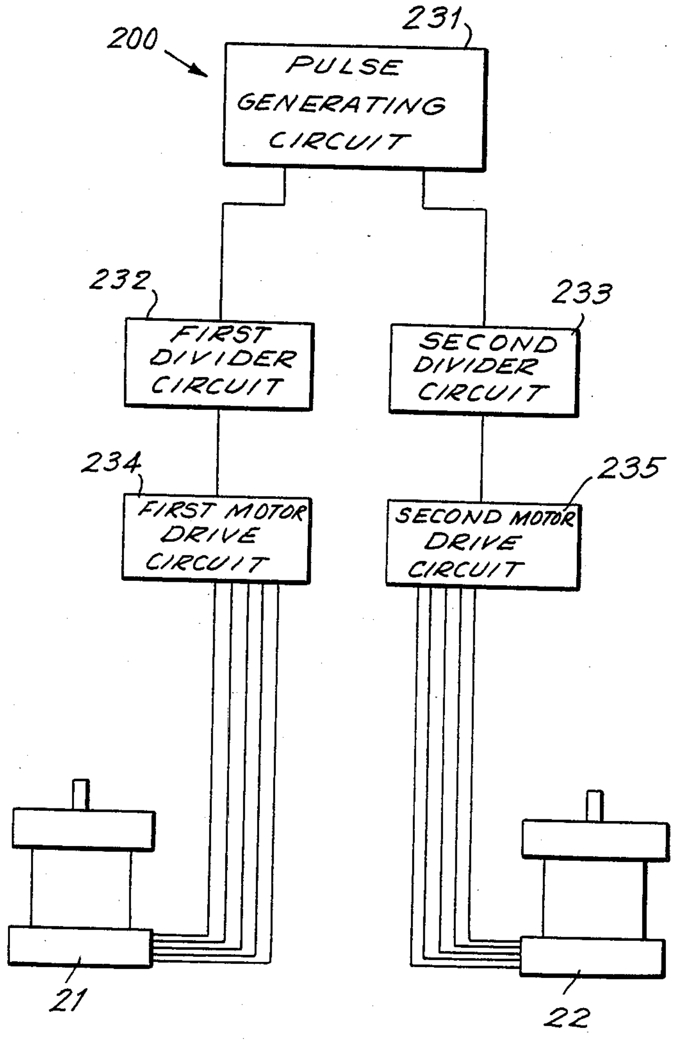
FIG. 3C is a functional block diagram view of a drive circuit for the printer of FIGS. 3A and 3B.

Reference is next made to FIG. 3C wherein a drive circuit, generally indicated as 200, constructed in accordance with the invention is depicted. Pulse generating circuit 231 produces a pulse signal which is provided to first divider circuit 232 and second divider circuit 233. First divider circuit 232 is coupled to first motor drive circuit 234 which in turn drives motor 21, which reciprocates thermal head 11 and magnetic head 16. Second divider circuit 233 is coupled to second motor drive circuit 235, which drives motor 22 which advance ink medium 12. As a result of having separate first and second divider circuits 232, 233 the speeds of rotation of motors 21 and 22 may be separately set. Thus, when transfer medium 15 is inserted, the relative speed between ink film 12 and thermal head 11 (x mm/sec.) and between transfer medium 15 and thermal head 11 (y mm/sec.) may be freely adjusted.

Various embodiments in which the relative speeds x and y have been adjusted to determine preferred relative speeds for high quality printing are described. The relative speeds x and y for each of the embodiments is shown in Table 1 below.

In embodiment 1, heat generating portion 115 of thermal head 11 (FIG. 2B) is supplied with pulses for printing the characters "ABC". The period for printing each dot is 1.75 msec, and the time during which application voltage 114 is applied, the application period, is 0.7 msec. The application voltage 114 is set at 5 V. The speed of magnetic ink medium 12 is set so that x equals 95 mm/sec and the relative speed of thermal head 11 and magnetic head 16 to transfer medium 15 is set so that y equals 80 mm/sec. This corresponds to a printing position of about 0.14 mm/dot.

As a result of the structure, when the printing data is applied to driving circuit 10 of thermal head 11, heat generating portion 115 is heated and the thermal energy is conducted to magnetic ink medium 12, which in turn melts the appropriate portions of magnetic ink layer 14. The melted ink is then magnetically attracted by permanent magnet 16 which causes magnetic ink dots 17 to be propelled across gap "a" into fixed contact with transfer medium 15.

Figure 4A:
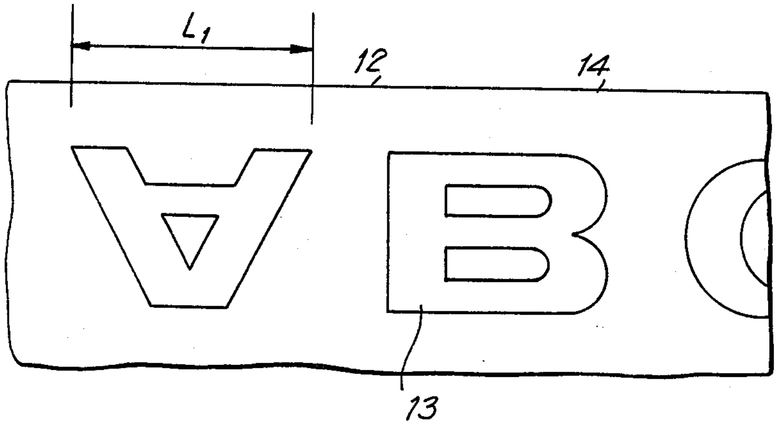
FIG. 4A is a cut-away schematic view of the magnetic ink medium after printing has been performed in accordance with a first method of printing in accordance with the invention.
Figure 4B:
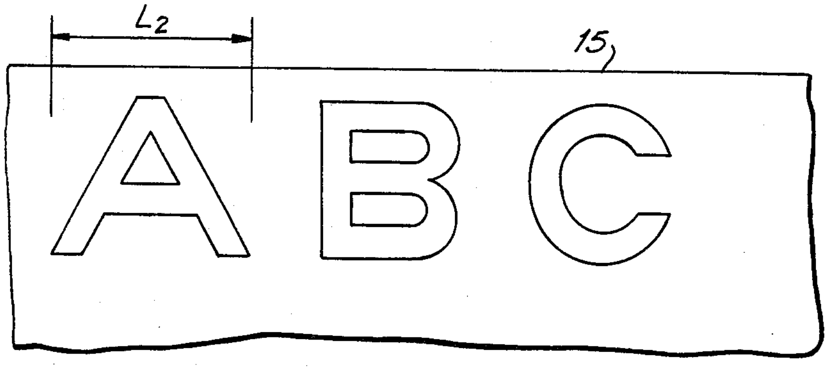
FIG. 4B is a cut-away schematic view of the printing on the transfer medium in accordance with the first printing method in accordance with the invention.

FIG. 4A shows ink medium 12 after the characters ABC have been printed, the magnetic ink having been pulled off of base layer 13 where dots have been printed. FIG. 4B shows the transfer medium after the characters ABC have been printed in accordance with embodiment 1. The width of the characters $L_1$ on ink medium 12 is approximately 1.2 times the width of the printed character $L_2$ on transfer medium 15 in FIG. 4B. This is due to the ratio between speeds x and y. The melted portions of the magnetic ink 14 shown as missing from ink medium 12 in FIG. 4A are compressed as they are printed thereby providing recording dots of particularly high density and high quality.

Embodiments 2–10 are variations in the relative speed x of magnetic ink medium 12 and of relative speed y of transfer medium 15 relative to thermal head 12. In embodiments 1 and 2 the relative speed of the transfer medium y equals 80 mm/sec, the period during which data is printed is 1.7 mm/sec and the speed of the magnetic ink medium is varied. In embodiments 3–5, the relative speed of the transfer medium y equals 100 mm/sec. The data printing period is 1.4 mm/sec and the ink ribbon speed x is varied. In embodiments 6–8, the speed of the transfer medium y equals 120 mm/sec, the data printing period is 1.17 msec and the ribbon speed x is varied. In embodiments 9–12 the speed of the transfer medium y equals 140 mm/sec, the data printing period is 1 msec and the ribbon speed x is varied.

The quality of printing in embodiments 1–12 is compared to the printing performed by utilizing a generally available thermal printer which uses an application voltage of 7 V with an application time of 0.7 msec where x and y are both 80 mm/sec.

Table 1 shows a comparison between the comparative embodiment and each of embodiments 1–12. The evaluation column uses various symbols to compare the printing of each of the embodiments to the printing with the comparative embodiment. The symbol "−" indicates that the dot density, dot shape, outline and the like are inferior to the comparable printing of the comparative embodiment. The symbol "=" indicates that the dot density, dot shape, outline and the like are substantially the same as that of the comparative embodiment. The symbol "+" indicates the dot density, dot shape, outline and the like are superior to the printing of the comparative embodiment. The symbol "++" is indicative of the embodiments which have printing which is among those embodiments which are superior to the comparative embodiment and are particularly excellent.

TABLE 1

| Embodiment | Relative speed (mm/sec.) | | Evaluation |
|---|---|---|---|
| | Ink Medium (x) | Transfer Medium (y) | |
| 1 | 95 | 80 | ++ |
| 2 | 80 | 80 | + |
| 3 | 140 | 100 | ++ |
| 4 | 110 | 100 | + |
| 5 | 100 | 100 | = |
| 6 | 150 | 120 | ++ |
| 7 | 130 | 120 | + |
| 8 | 120 | 120 | = |
| 9 | 180 | 140 | ++ |
| 10 | 160 | 140 | + |
| 11 | 150 | 140 | = |
| 12 | 140 | 140 | − |

As a result, embodiments 1, 3, 6 and 9 are evaluated as "++" with each of them having a higher relative ink medium speed x then transfer medium speed y. As shown in FIGS. 4A and 4B, the transferred width $L_2$ of the melted ink is less than the actual width $L_1$ of ink melted, thereby compressing the placement of the dots during the printing process which results in high quality printing. As a result, even if the printing speed is increased, as shown where the transfer medium speed is 100, 120 or 140 mm/sec, it is possible to perform high quality printing by varying the relative speed ratio.

In addition to the twelve embodiments described above, wherein the speed of the ribbon x is greater than the relative speed of the transfer medium y, a thirteenth embodiment in which the reverse is true is now described. As with embodiments 1–2, the data printing period is 1.75 msec and the application voltage period is 0.7 msec with an application voltage of 5 V. Each character is constructed so as to fit within a 24×12 character matrix (24 dots vertically by 12 dots wide). The relative speed of magnetic ink medium 12, x is set to 40 mm/sec while the relative speed of the transfer medium y is set to 80 mm/sec.

Figure 5A:
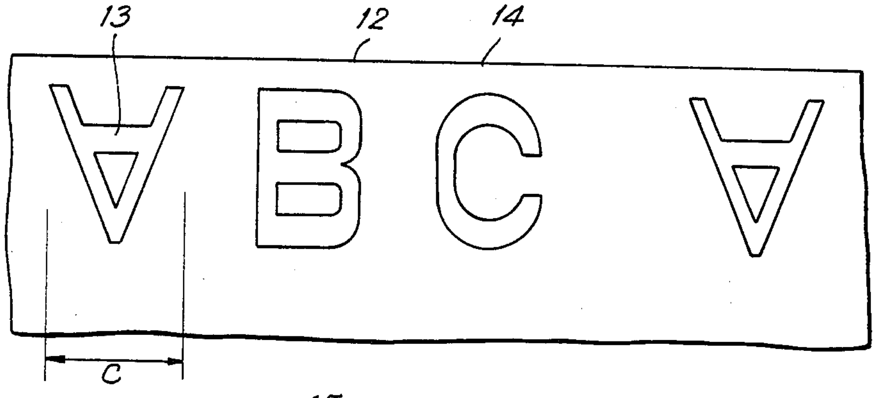
FIG. 5A is a cut-away schematic view of the magnetic ink medium after printing has been performed in accordance with a second printing method in accordance with the invention.
Figure 5B:
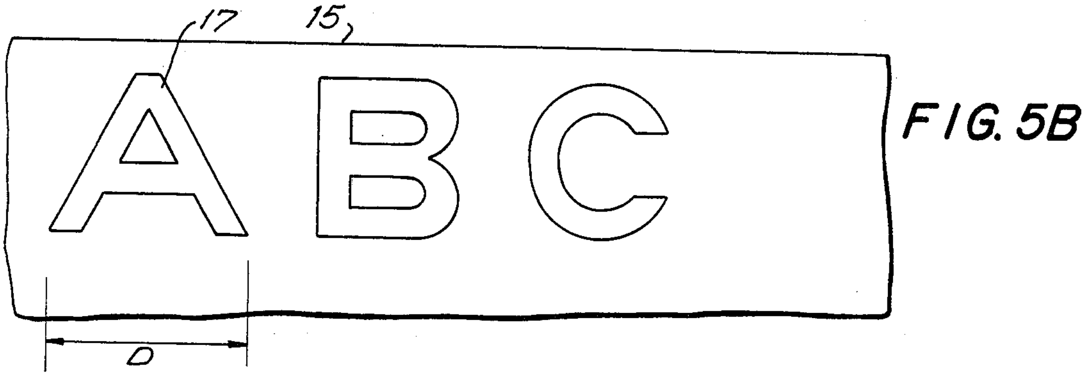
FIG. 5B is a cut-away schematic view of the printing on a transfer medium in accordance with the second method of printing in accordance with the invention.

FIG. 5A, similarly to FIG. 4A, shows ink medium 12 after the characters "ABC A" have been printed with the magnetic ink missing from the positions where the melted ink dots have been transferred off of base layer 13. Likewise, FIG. 5B as in FIG. 4B, shows the transfer medium with the transferred ink. Each of the characters, such as the "A" is made up of many individual small dots. In accordance with the printing method it is possible to spread out the dots to print the draft mode characters. As shown in FIG. 5A, the width of the ink portion removed from ink medium 12 is a width C, where C is approximately 1.5 mm per character. The actual width of the printed character on transfer medium 15 is shown in FIG. 5B as D, where D is 3 mm, twice the width of the ink utilized on ink medium 12. This type of printing is particularly useful for draft mode printing where the quality of the printing is not critical.

Therefore, it is possible to reduce the amount of magnetic ink medium utilized by a half as compared with the prior thermal printer by changing the speed of movement of the magnetic ink medium. Various other combinations of ratios of x and y are possible in the draft mode with corresponding savings in ink medium conservation.

In addition, all the embodiments 1–13 can be performed using a line printer wherein the thermal head 11 is a 180 DPI (dot per inch) head, the effective width of the printing area is secured and the transfer medium is moved at y mm/sec. In this situation the same results are obtained for embodiments 1–13.

In addition, when the relative speed y of the transfer medium is negative, that is the transfer medium or heads are moved in the opposite direction, the same results are obtained. Utilizing the high quality printing method where the speed of the ink medium is greater than the relative speed of the transfer medium and the draft mode approach where the speed of the ink medium ribbon is less than the relative speed of the transfer medium, there is no need for the ink medium to be formed with an ink which will easily separate from the transfer paper.

Accordingly, a printer and method of printing utilizing thermoplastic magnetic ink which provides excellent quality printing on a broad range of transfer mediums, even those with high surface roughness in which the ink adheres securely to the transfer medium is provided. A printer and method of printing which conserves the ink medium in a draft printing mode to reduce the costs of operating the printer is also provided.

It will thus be seen that the objects set forth above, among those made apparent from the preceding description, are efficiently attained and, since certain changes may be made in carrying out the above method in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A printer for printing on a transfer medium utilizing thermoplastic magnetic ink, comprising:

a thermal head for selectively applying thermal energy to melt selected portions of the thermoplastic magnetic ink;

a magnetic head substantially spatially fixed relative to the thermal head for applying a magnetic force to the thermoplastic ink which causes the melted portions to be transferred onto the transfer medium;

a strip of thermoplastic magnetic ink medium positioned for displacement in the space between the thermal head and transfer medium, the strip including a base layer facing and contacting the thermal head and a thermoplastic magnetic ink layer facing the transfer medium;

first movement means for moving one of the transfer medium and the thermal and magnetic heads relative to the other at a first speed; and second movement means for moving the magnetic thermoplastic ink medium strip relative to the magnetic and thermal heads at a second speed, the first and second movement means being adapted to permit the first and second speeds to be unequal.

2. The printer of claim 1 wherein the first speed is greater than the second speed.

3. The printer of claim 1 wherein the second speed is greater than the first speed.

4. The printer of claim 1 wherein the thermal head includes drive circuit means for selectively heating sections of the thermal head to melt selected portions of the thermoplastic magnetic ink on the thermoplastic magnetic ink medium strip.

5. The printer of claim 4 wherein the drive circuit means includes at least one heat generating means for converting electrical energy to thermal energy, switch means for selectively applying electrical energy to the heat generating means and pulse generating means coupled to the switch means for selectively causing the switch means to apply electrical energy to the heat generating means.

6. The printer of claim 5 wherein the switch means includes a transistor having a switching terminal and the pulse generating means is coupled to the switching terminal.

7. The printer of claim 1 wherein the magnetic head is a permanent magnet.

8. The printer of claim 1 wherein the first movement means includes a motor for moving the thermal and magnetic heads relative to the transfer medium.

9. The printer of claim 8 wherein the thermal head is mounted on a carriage.

10. The printer of claim 9 wherein the carriage is coupled to a first belt, the magnetic head is coupled to a second belt and the first and second belts are synchronously driven by the first motor.

11. The printer of claim 1 wherein the second movement means includes a second motor for driving the ink medium strip.

12. The printer of claim 9 wherein the second movement means includes a second motor for driving the ink medium strip.

13. The printer of claim 12 wherein second motor and thermoplastic magnetic ink medium are supported on the carriage.

14. The printer of claim 9 wherein the second movement means and thermoplastic magnetic ink medium are supported on the carriage.

15. The printer of claim 1 further comprising drive control means coupled to the first and second movement means for varying the first and second speeds.

16. The printer of claim 15 wherein the drive control means includes pulse generating means for generating driving pulses and first and second divider means coupled to the pulse generating means for dividing the driving pulses to drive the first and second movement means at different speeds.

17. The printer of claim 16 wherein the first movement means includes a first motor, the second movement means includes a second motor and the first divider means drives the first motor and the second divider means drives the second motor.

18. The printer of claim 1 wherein the strip of thermoplastic magnetic ink medium is formed as a ribbon.

19. A method for printing on a transfer medium with thermoplastic magnetic ink, comprising:

moving a thermoplastic magnetic ink medium at a first speed relative to a thermal head and a magnetic head;

moving one of the magnetic head and the thermal head, and the transfer medium at a second speed, not equal to the first speed, relative to the other;

melting selected portions of the thermoplastic magnetic ink on a thermoplastic magnetic ink medium with the thermal head; and transferring the melted ink from the thermoplastic magnetic ink medium to the transfer medium by magnetic force applied by a magnetic head.

20. The method of claim 19 wherein the first speed is greater than the second speed, whereby high quality printing is performed.

21. The method of claim 19 wherein the second speed is greater than the first speed whereby conservation of the thermoplastic magnetic ink medium is obtained.

22. The method of claim 19 wherein the melted ink is transferred to the transfer medium by applying a magnetic force.

* * * * *